UNITED STATES PATENT OFFICE.

LEWIS S. CHICHESTER, OF BROOKLYN, NEW YORK, ASSIGNOR TO CHARLES F. CHICHESTER, OF SAME PLACE.

IMPROVEMENT IN FOOD COMPOUNDS.

Specification forming part of Letters Patent No. 136,302, dated February 25, 1873.

*To all whom it may concern:*

Be it known that I, LEWIS S. CHICHESTER, of Brooklyn, Kings county, State of New York, have invented an Improved Food Compound, of which the following is a specification:

This food compound is adapted to the laboring classes as supplying the materials required to supply the muscles as well as to promote health and vigor in the brain.

I make use of a mixture of desiccated maize and oats, ground to suitable-sized granules. This is a new article of food, and is more palatable and wholesome than either maize or oats alone.

It is desirable that the food for winter use contains a surplus of carbonates, and that in the summer food the proportion of phosphates and nitrates be increased. With my food compound this is accomplished by varying the proportion of maize and oats. For summer food the southern corn is preferable, as containing a larger proportion of phosphates and nitrates, and the northern corn is superior for winter food on account of the larger proportion of carbonates.

My improved food compound is superior to either maize or oats alone, because the maize is often too much of a laxative, while the oats is heating to the blood and sour in the stomach.

For winter food about one-third maize and two-thirds oats, both in a desiccated and granulated condition, contains about 17.13 parts nitrates, 76.27 parts carbonates, 2.60 parts phosphates, and 4 parts water. The proportion of equal parts of maize and oats in a desiccated and granulated condition and adapted to summer food, contains about 29.59 parts nitrates, 62.50 parts carbonates, 3.91 parts phosphates, and 4 parts water.

I claim as my invention—

The new article composed of a mixture of desiccated and granulated maize and oats, as set forth.

Signed by me this 12th day August, A. D. 1872.

LEWIS S. CHICHESTER.

Witnesses:
  GEO. T. PINCKNEY,
  CHAS. H. SMITH.